US009904758B2

(12) United States Patent
Berzins et al.

(10) Patent No.: US 9,904,758 B2
(45) Date of Patent: Feb. 27, 2018

(54) USING DEEP SUB-MICRON STRESS EFFECTS AND PROXIMITY EFFECTS TO CREATE A HIGH PERFORMANCE STANDARD CELL

(71) Applicants: Matthew Berzins, Cedar Park, TX (US); Andrew Paul Hoover, Austin, TX (US)

(72) Inventors: Matthew Berzins, Cedar Park, TX (US); Andrew Paul Hoover, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/208,601

(22) Filed: Jul. 12, 2016

(65) Prior Publication Data
US 2017/0337320 A1    Nov. 23, 2017

Related U.S. Application Data

(60) Provisional application No. 62/338,495, filed on May 18, 2016.

(51) Int. Cl.
*G06F 17/50* (2006.01)

(52) U.S. Cl.
CPC ...... *G06F 17/5081* (2013.01); *G06F 17/5031* (2013.01); *G06F 2217/62* (2013.01); *G06F 2217/84* (2013.01)

(58) Field of Classification Search
CPC ............. G06F 17/5081; G06F 17/5031; G06F 2217/84; G06F 2217/62
See application file for complete search history.

(56) References Cited

U.S. PATENT DOCUMENTS 7,480,604 B2 *   1/2009   Bianchi ............... G06F 17/5036
                                                    703/14
7,592,676 B2 *   9/2009   Nakanishi ........... H01L 27/0207
                                                    257/206

(Continued)

OTHER PUBLICATIONS

Topaloglu, Rasit Onur, "Standard Cell and Custom Circuit Optimization using Dummy Diffusions through STI Width Stress Effect Utilization," IEEE 2007 Custom Integrated Circuits Conference (CICC), Sep. 19, 2007, pp. 619-622.

(Continued)

*Primary Examiner* — Naum B Levin
(74) *Attorney, Agent, or Firm* — Renaissance IP Law Group LLP

(57) ABSTRACT

According to one general aspect, a method may include receiving a circuit model that includes logic circuits that are represented by respective cells. The method may include providing a timing adjustment to the circuit model. This providing may include determining one or more respective cells that are candidates for adjustment by employing a sub-micron stress effect, and, for each candidate, replacing a candidate cell with a stressed cell, wherein a candidate cell and stressed cell perform a same logical function. Each stressed cell may include: a gate electrode, a first gate-cut shape disposed to cut the gate electrode, wherein the first gate-cut shape is disposed upon a row-boundary, a second gate-cut shape disposed upon the row-boundary, a gate-cut break disposed between the first gate-cut shape and the second gate-cut shape, an active region, and an active-cut shape disposed to cut the active region.

20 Claims, 6 Drawing Sheets

(56) References Cited

U.S. PATENT DOCUMENTS

| | | | |
|---|---|---|---|
| 7,600,207 B2* | 10/2009 | Moroz | G06F 17/5068 716/122 |
| 7,681,164 B2* | 3/2010 | Lin | G06F 17/5072 716/120 |
| 7,895,548 B2 | 2/2011 | Lin et al. | |
| 8,368,170 B2* | 2/2013 | Chuang | H01L 21/823412 257/401 |
| 8,392,856 B2* | 3/2013 | Misaka | G06F 17/5072 716/134 |
| 8,455,354 B2 | 6/2013 | Chen et al. | |
| 8,631,374 B2* | 1/2014 | Sherlekar | G06F 17/5068 716/118 |
| 8,735,869 B2 | 5/2014 | Cappellani et al. | |
| 8,782,576 B1* | 7/2014 | Bowers | H01L 27/11521 716/126 |
| 8,881,083 B1 | 11/2014 | Deng et al. | |
| 8,987,128 B2* | 3/2015 | Rashed | G06F 17/5068 257/773 |
| 9,026,975 B2* | 5/2015 | Song | G06F 17/5081 703/14 |
| 9,355,207 B2* | 5/2016 | Walker | G06F 17/5081 |
| 9,548,137 B2* | 1/2017 | Querbach | G06F 11/263 |
| 2010/0100856 A1 | 4/2010 | Mittal | |
| 2014/0001564 A1* | 1/2014 | Song | G06F 17/5081 257/369 |
| 2014/0048889 A1* | 2/2014 | Bitterlich | H01L 27/0207 257/369 |
| 2015/0286765 A1 | 10/2015 | Wang et al. | |

OTHER PUBLICATIONS

Wikipedia, the free encyclopedia, "Standard cell," (https://en.wikipedia.org/wiki/Standard_cell), retrieved Jun. 14, 2016, 5 pages.

* cited by examiner

USING DEEP SUB-MICRON STRESS EFFECTS AND PROXIMITY EFFECTS TO CREATE A HIGH PERFORMANCE STANDARD CELL

CROSS-REFERENCE TO RELATED APPLICATION

This application claims priority under 35 U.S.C. § 119 to Provisional Patent Application Ser. No. 62/338,495, entitled "USING DEEP SUB-MICRON STRESS EFFECTS AND PROXIMITY EFFECTS TO CREATE A HIGH PERFORMANCE STANDARD CELL" filed on May 18, 2016. The subject matter of this earlier filed application is hereby incorporated by reference.

TECHNICAL FIELD

This description relates to the design of electrical circuits, and more specifically to the manufacture of electrical circuits.

BACKGROUND

In semiconductor design, standard cell methodology is a method of designing integrated circuits (ICs) with generally uniform design blocks or elements. Standard cell methodology is an example of design abstraction, whereby a low-level very-large-scale integration (VLSI) layout is encapsulated into an abstract logic representation (such as a NAND gate). Cell-based methodology has made it possible for one designer to focus on the high-level (logical function) aspect of digital design, while another designer focuses on the aspect of (physical) implementation. Along with semiconductor manufacturing advances, standard cell methodology has helped designers scale ICs from comparatively simple single-function ICs (of several thousand gates), to complex multi-million gate system-on-a-chip (SoC) devices.

A standard cell is a group of transistors and interconnect structures that provides a Boolean logic function (e.g., AND, OR, XOR, XNOR, inverters) or a storage or register function (e.g., a flip-flop or a latch). The simplest cells are direct representations of the elemental NAND, NOR, and XOR Boolean functions, although cells of much greater complexity are commonly used. Generally cells are designed to act as literal building blocks of predefined widths and/or heights, such that multiple cells may be arranged in a regular predictable rectangular structure.

A standard cell library is a collection of electronic logic functions of various complexity, such as NAND, NOR, flip-flops, latches, inverters, and buffers. These cells are realized as fixed-height, variable-width cells. One key aspect with these libraries is that they are of a fixed height, which enables them to be placed in rows, easing the process of automated digital layout. The cells are typically optimized full-custom layouts, which minimize delays and area.

Standard cell design for field effect transistors (FET) occasionally includes Fin-FET technology. A Fin-FET includes a non-planar transistor formed with a thin silicon fin. The distance from source to drain determines the effective channel length of the device.

Such Fin-FET technology is typically burdened by many deep sub-micron stress and proximity effects. Such effects create issues such as inefficient layout and/or poor performance. For example, having breaks in patterns or continuous patterns can cause devices that neighbor these patterns to have undesired electrical characteristics that result in actual silicon results that are uncorrelated to modeled simulation. Layout area is frequently wasted because mitigation of such undesired electrical effects is accomplished with an open space distance from the pattern.

SUMMARY

According to one general aspect, a method may include receiving a circuit model that includes logic circuits that are represented by respective cells. The method may include providing a timing adjustment to the circuit model. This providing may include determining one or more respective cells that are candidates for adjustment by employing a sub-micron stress effect, and, for each candidate, replacing a candidate cell with a stressed cell, wherein a candidate cell and stressed cell perform a same logical function. Each stressed cell may include: a gate electrode, a first gate-cut shape disposed to cut the gate electrode, wherein the first gate-cut shape is disposed upon a row-boundary, a second gate-cut shape disposed upon the row-boundary, a gate-cut break disposed between the first gate-cut shape and the second gate-cut shape, an active region, and an active-cut shape disposed to cut the active region, wherein the active-cut shape is also completely enclosed within the respective stressed cell.

According to another general aspect, a computer program product for adjusting a timing of a digital circuit, the computer program product being tangibly embodied on a computer-readable medium and including executable code that, when executed, is configured to cause a data processing apparatus to detect a timing issue with first cell, wherein the first cell, when active, performs a combinatorial logic function. The code may cause the apparatus to replace, within a circuit model, the first cell with a second cell that, when active, performs a same combinatorial logic function as the first cell more quickly than the first cell. The second cell may include a gate electrode, a first gate-cut shape disposed to cut the gate electrode, wherein the first gate-cut shape is disposed upon a row-boundary, a second gate-cut shape disposed upon the row-boundary, a gate-cut break disposed between the first gate-cut shape and the second gate-cut shape, an active region, and an active-cut shape disposed to cut the active region, wherein the active-cut shape is also completely enclosed within the respective stressed cell.

According to another general aspect, a method may include receiving a circuit model that includes logic circuits which include representations of a set of register circuits. The method may also include determining a timing associated with each logic circuit. The method may include, for each logic circuit, associating each logic circuit with a standard cell family, where all standard cells included by the standard cell family perform, when active, a same logic function, and associating each logic circuit with either an unstressed version of the standard cell family or a stressed version of the standard cell family. The stressed cell may include at least one of either a gate-cut break portion or an active-cut portion. The gate-cut break portion may include a gate electrode, a first gate-cut shape disposed to cut the gate electrode, wherein the first gate-cut shape is disposed upon a row-boundary, a second gate-cut shape disposed upon the row-boundary, and a gate-cut break disposed between the first gate-cut shape and the second gate-cut shape. The active-cut portion may include an active region, and an active-cut shape disposed to cut the active region, wherein the active-cut shape is also completely enclosed within the stressed cell.

The details of one or more implementations are set forth in the accompanying drawings and the description below. Other features will be apparent from the description and drawings, and from the claims.

A system and/or method for the design of electrical circuits, and more specifically to the manufacture of electrical circuits, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
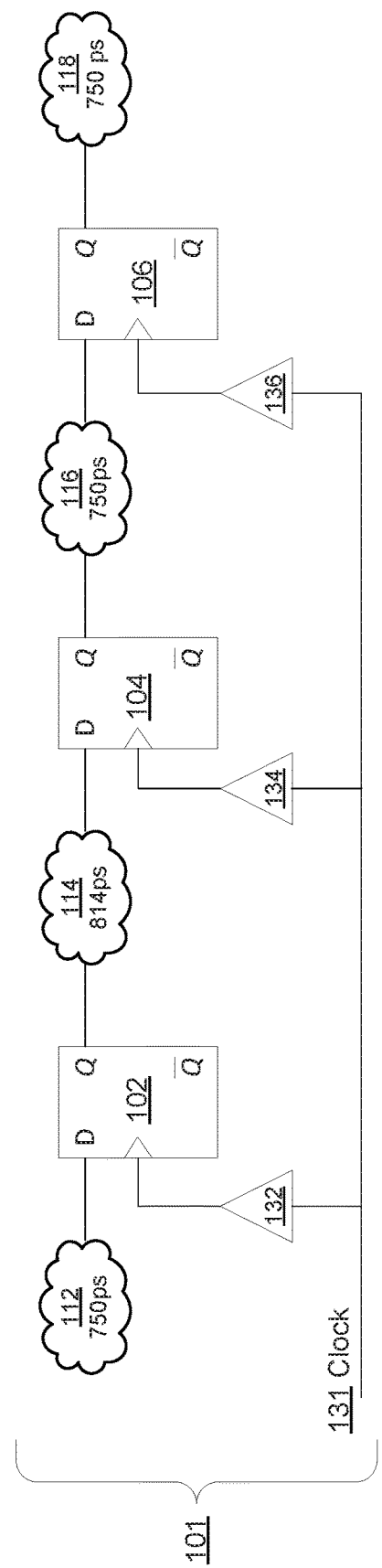
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 101 in accordance with the disclosed subject matter. The illustrated embodiment shows a simplified example of series of combinatorial logic gates or circuits separated by a series of register elements.

In the illustrated embodiment, the system 101 may include three flip-flops (or more generally "register elements") 102, 104, and 106. The system 101 may also include four combinatorial logic portions 112, 114, 116, and 118. In various embodiments, the combinatorial logic portions may include various electrical circuits, such as, for example NAND gates, NOR gates, capacitors, resistors, etc. It may take a certain amount of time for an input to the combinatorial logic to be processed and to result in an output to the combinatorial logic portion.

The allowable processing time for combinatorial logic is determined by the period of signal 131, along with the clock skew (between, for example, clock buffers 132, 134, and 136), the delay from register clock to Q output, and the setup time requirement between register D input to clock pin. If the combinatorial logic processing time is greater than the allowable amount, then the output of the combinatorial logic circuit will not be ready when the flip-flop associated with the output stores the output signal. In the illustrated embodiment, the clock frequency may allow for a processing time of 775 picoseconds (ps). The combinatorial logic circuits 112, 116, and 118 may all require 750 ps to process their respective inputs. However, the combinatorial logic circuit 114 may require 814 ps, or 39 ps more than the allotted time. In various embodiments, this may be ameliorated by increasing the clock period or decreasing the clock frequency.

However, in the illustrated embodiment, one may build or manufacture the combinatorial logic circuit 114 in whole or in part out of a circuit cell that has been stressed in such a way that the performance of the circuit has been increased (as compared to an unstressed circuit). Such a circuit is described in reference to FIGS. 2a and 2b. By employing a stressed circuit or cell, the combinatorial logic 114 may be sped-up sufficiently that the outputs may be able to stabilize before the clock signal 131 triggers the register element 104. It is understood that the above are merely a few illustrative examples to which the disclosed subject matter is not limited.

Figure 2A:
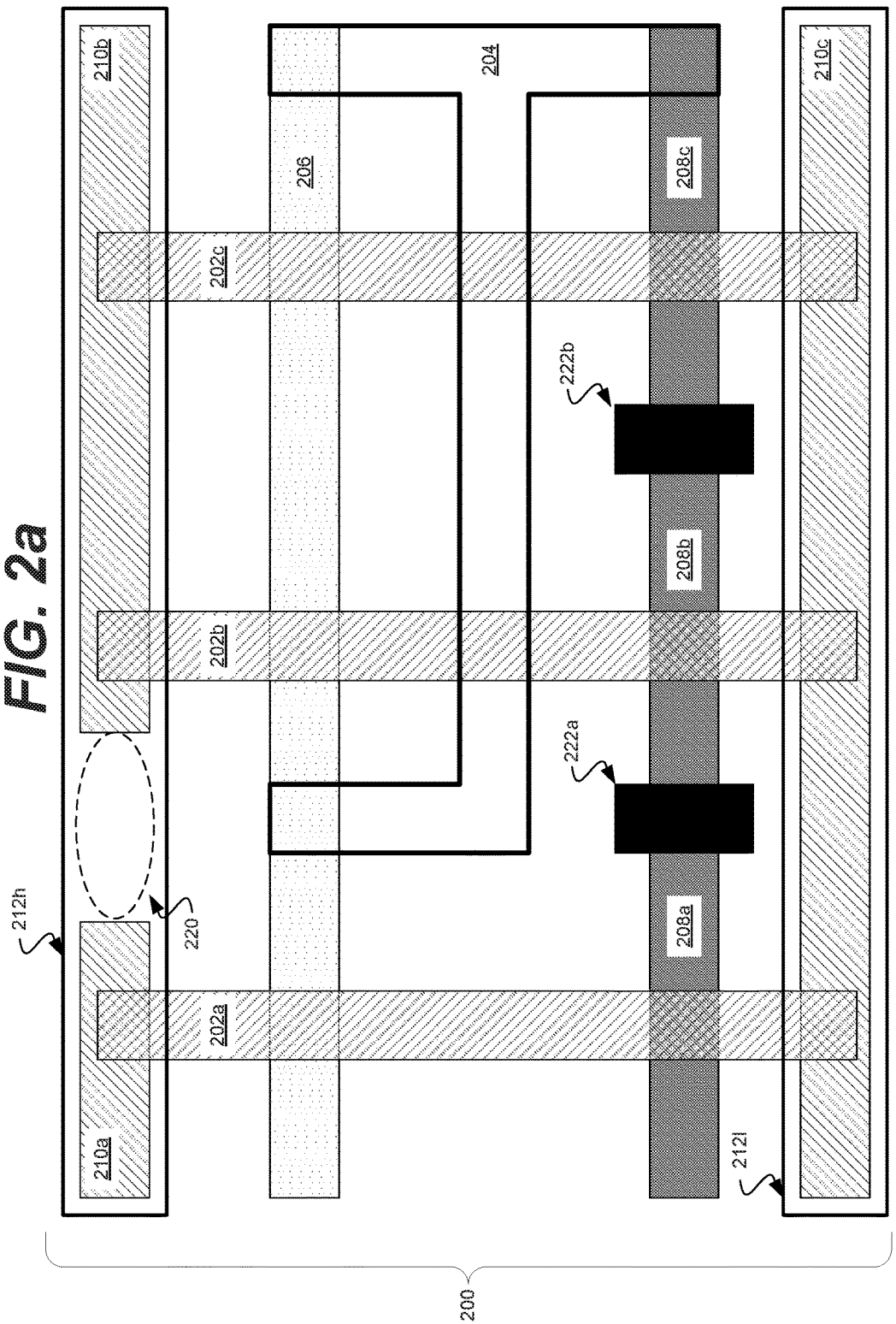
FIG. 2a is a block diagram of an example embodiment of a cell in accordance with the disclosed subject matter.

FIG. 2a is a block diagram of an example embodiment of a system or cell 200 in accordance with the disclosed subject matter. In the illustrated embodiment, the system 200 may include a standardized circuit cell that may be found within a cell library. In the illustrated embodiment, the layout of the cell 200 may be altered from the traditional cell layout to create beneficial stresses upon the structures of the cell.

It is understood that the illustrated embodiment is merely for explanatory purposes, and not for actual manufacture. The figure is designed for one skilled in the art to understand the disclosed subject matter and pertinent features thereof.

In the illustrated embodiment, the cell 200 may include a 3-input NAND gate; although, it is understood that the illustrated embodiment is merely one illustrative example to which the disclosed subject matter is not limited. The cell 200 may include three inputs 202a, 202b, and 202c. The cell 200 may include an output 204.

In the illustrated embodiment, all the inputs 202a, 202b, and 202c, the output 204 may operate within a single voltage domain. In such an embodiment, the cell 200 may not be configured to perform any level shifting. It is understood that the above are merely a few illustrative examples to which the disclosed subject matter is not limited.

The cell 200 may include complementary metal-oxide semiconductor (CMOS) technology, and therefore include a PMOS and an NMOS portion. The PMOS portion may include a p-diffusion area or PMOS active portion 206. The NMOS portion may include an n-diffusion area or NMOS active portion, cut into three parts 208a, 208b, and 208c.

In the illustrated embodiment, the three inputs 202a, 202b, and 202c may be created in a layer of polysilicon (poly-Si) or Polycrystalline silicon, or another material such as a metal gate material. In such an embodiment, the edges of the input shapes 202a, 202b, and 202c may be cut or terminated by one or more layers or shapes of gate-cut or poly-cut 210a, 210b, and 210c. Note that although shapes 202a, 202b, and 202c may or may not be created using polysilicon, for simplicity, shapes 210a, 210b, and 210c will be referred to as "poly"-cut layers or shapes.

In the illustrated embodiment, the poly-cut layers or shapes 210a, 210b, and 210c may be placed along a row boundary. As described above, cells (e.g., cell 200) may be of uniform or predetermined sizes. One of the most frequently used sizes is a height unit known as a row that allows all cells to be of uniform height or at least align to certain heights. A single row cell (e.g., cell 200) would occupy from a first row boundary (illustrated by the placement of the poly-cut 210c) to a second row boundary (illustrated by the placement of the poly-cut shapes 210a and 210b). In various embodiments, cells may occupy double rows in height, or even triple rows, or more generally a plurality of row heights.

In the illustrated embodiment, powerlines, voltage sources, or ground wires may also occupy the row boundary, but at a different depth. Although, such may not be employed for all possible embodiments. For example, the Vdd, or high voltage signal, may be transmitted via the metal layer 212h and the ground signal may be transmitted via the metal layer 212l. In various embodiments, one or more of these voltage layers 212h and 212l may overlap or run in parallel to one or more of the poly-cut layers or shapes 210a, 210b, and 210c.

In the illustrated embodiment, the output 204 may be created within a metal layer. In various embodiments, the output 204 or other layers or shapes (e.g., polysilicon 202a, and so on) may be created in other materials based upon the fabrication process expected to be employed to manufacture the circuit dictated by the cell 200. It is understood that the above are merely a few illustrative examples to which the disclosed subject matter is not limited.

In the illustrated embodiment, stress (e.g., at the sub-micron level) may be applied to the circuit to increase its performance. In one embodiment, the poly-cut (poly-cut 210a and 210b) may be created with a break portion 220. In such an embodiment, the poly-cut break 220 may increase the performance of the PMOS region or portion. In some embodiments, this may alter the stress on nearby transistors and resultingly alter the carrier mobility or electronic band structure; although, it is understood that the above are merely a few illustrative examples to which the disclosed subject matter is not limited. In the illustrated embodiment, a single poly-cut break 220 is shown but additional poly-cut breaks 220 may be employed.

Likewise, stress (e.g., at the sub-micron level) may be applied to the NMOS portion of circuit to increase its performance. In the illustrated embodiment, an active cut (AC) shape 222a may be made across the NMOS active region 208a & 208b. In such an embodiment, the active-cut shape 222a may increase the performance of the NMOS region or portion. In some embodiments, this may alter the stress on nearby transistors and resultingly alter the carrier mobility or electronic band structure; although, it is understood that the above are merely a few illustrative examples to which the disclosed subject matter is not limited. In the illustrated embodiment, a plurality of active-cut shapes 222a and 222b are shown but a single active-cut shape or a greater plurality of active-cut shapes may be employed. Because the active cut shapes 222a and 222b break the active region into different active segments 208a, 208b, and 208c, additional interconnection (e.g. metal, etc.) may be required to maintain circuit connectivity. For simplicity, this interconnection is not shown.

In various embodiments, the stressed cell 200 may reduce the delay included by the circuit embodied in the cell 200 by at least half that compared to a traditional unstressed cell, without the active-cut shapes 222a and 222b, or the poly-cut break 220. In another embodiment, this may include an overall speed improvement of substantially 20% or less (e.g., 17%). In various embodiments, stress effects may be employed to improve the transition characteristics of a cell (e.g., rising transition for NOR, rising transition for NAND). In some embodiments, the stress effect (as each stressor generally acts upon either the NMOS or PMOS portion) may have an asymmetrical effect upon the transition timing. In one such embodiment, the stress effects may improve the rise/fall symmetry.

In addition, in some embodiments, additional speed increases (e.g., of about 25%) may be accomplished by pairing the stress effects with other timing techniques (e.g., skew, and so on). In yet another embodiment, improvements in the speed of the overall design of the integrated circuit may be possible as the next circuit's or cell's speed may be improved due to a faster slew provided by the current gate.

Figure 2B:
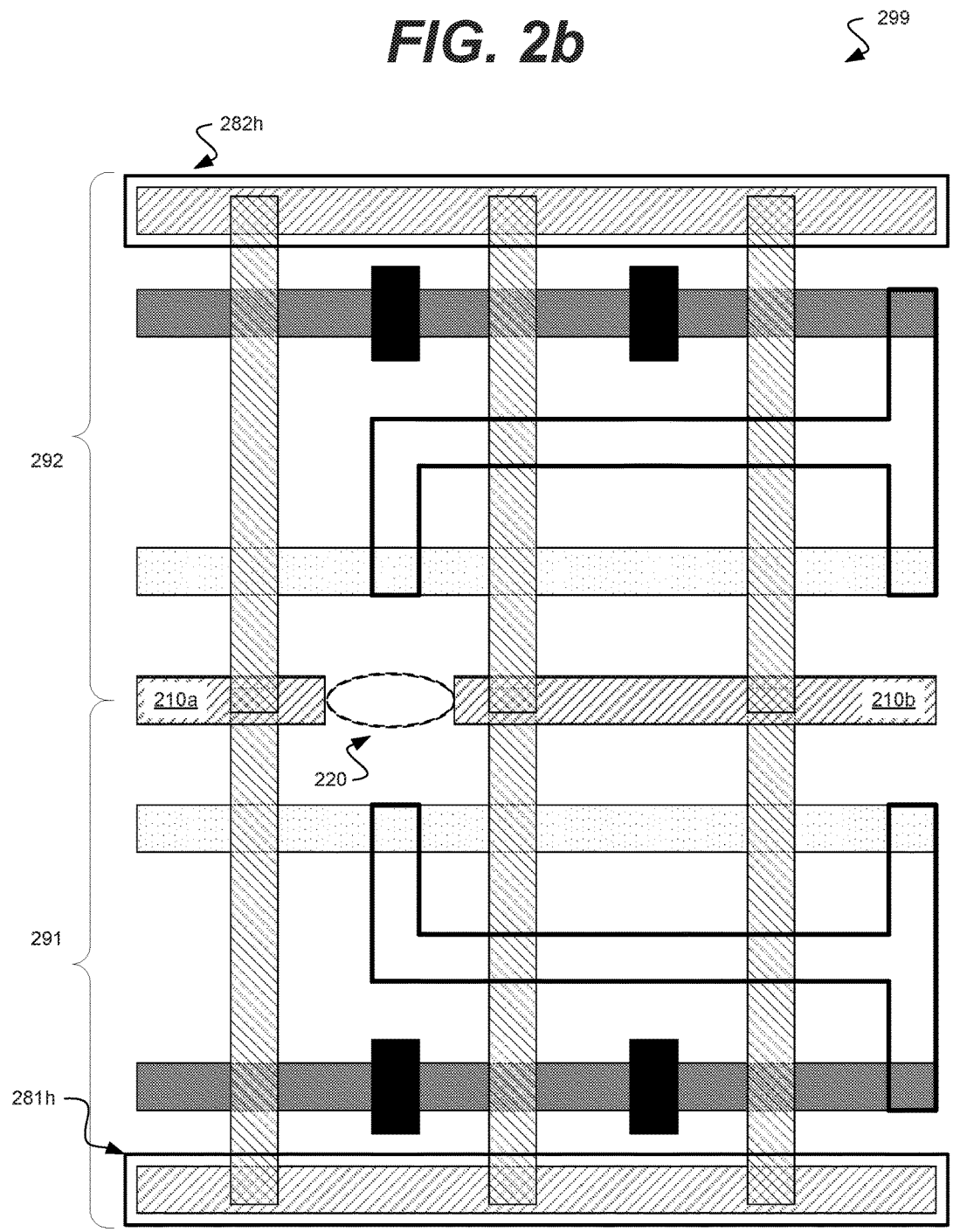
FIG. 2b is a block diagram of an example embodiment of a cell in accordance with the disclosed subject matter.

FIG. 2b is a block diagram of an example embodiment of a system or cell 299 in accordance with the disclosed subject matter. In the illustrated embodiment, the system 299 may include a standardized circuit cell that may be found within a cell library. In the illustrated embodiment, the layout of the cell 299 may be altered from the traditional cell layout to create beneficial stresses upon the structures of the cell. Due to the size limitations of the figure, reference numbers not immediately discussed are not shown, and may be treated as identical to FIG. 2a.

While the cell 200 of FIG. 2a showed a single height or row cell, the cell 299 illustrates a double-row cell. The cell 299 may include an upper portion 292 and a lower portion 291. In such an embodiment, the cell 299 may include two edge row boundaries (parallel with metal layers 282h and 281h), and at least one middle row boundary (parallel with poly-cut 210a and 210b). In the illustrated embodiment, only one middle row boundary is shown but if the cell was three or more rows high, additional middle row boundaries would intersect the cell.

In a single row cell (e.g., cell 200 of FIG. 2a) it may not be desirable for the poly cut break 220 to be formed on the power rail 212h of FIG. 2a. Such formation may not be feasible without conflicting with other cells that abut above/below the cell. In various embodiments, cells may overlap at the row boundary (similarly to that shown by the sharing of 210a and 210b between portions 291 and 292). Therefore, stacked cells (those above and below) may share a power line (e.g., power lines 212l, 212h of FIGS. 2a, or 282h and 281h of FIG. 2b) and poly-cut region. Therefore a break (e.g., break 220) in one cell may affect another cell, if the cell is one row high.

In the illustrated embodiment, a double row cell is employed with the poly-cut break 220 along the middle row boundary. Therefore, no abutting cells inadvertently share the poly-cut break 220, and potential conflict is avoided. Further, in various embodiments, to avoid disturbing the timing on adjacent cells due to the poly-cut break effect, the present circuit cell 299 may include additional area on the left and right of the circuit cell (not shown). For example, if the poly-cut break 220 is too close to the left edge of the cell 299 the poly-cut break effect may affect or bleed into the cell immediately to cell 299's left. In some embodiments, the cell 299 may include unused space or padding to protect any adjacent cell from the effects of the poly-cut break 220. It is understood that the above are merely a few illustrative examples to which the disclosed subject matter is not limited.

In the illustrated embodiment, the 3-input NAND is again shown but it has been duplicated both in the lower portion or row 291, and upper portion or row 292 of cell 299. The 1-row version of the cell may be mirrored or flipped to achieve the desired placement of the poly-cut break 220. In some embodiments, the double-row cell 299 may include two circuits that perform the same logical function, either independently using different inputs/outputs, or in parallel to produce the same result but with increased drive strength (e.g., at least 1.5 times the drive strength of a single-row cell). In another embodiment, each row portion of a two-rowed cell may perform a different logical function (e.g., NAND or NOR). It is understood that the above are merely a few illustrative examples to which the disclosed subject matter is not limited.

In various embodiments, the use of multi-rowed cells may cause an area penalty compared to a standard or traditional cell. As described above, techniques such as pairing, mirroring, or otherwise placing similar gates or circuits above each other may ameliorate the area penalty incurred. In such an embodiment, the area consumption of a multi-rowed cell may be more efficiently utilized.

Figure 3:
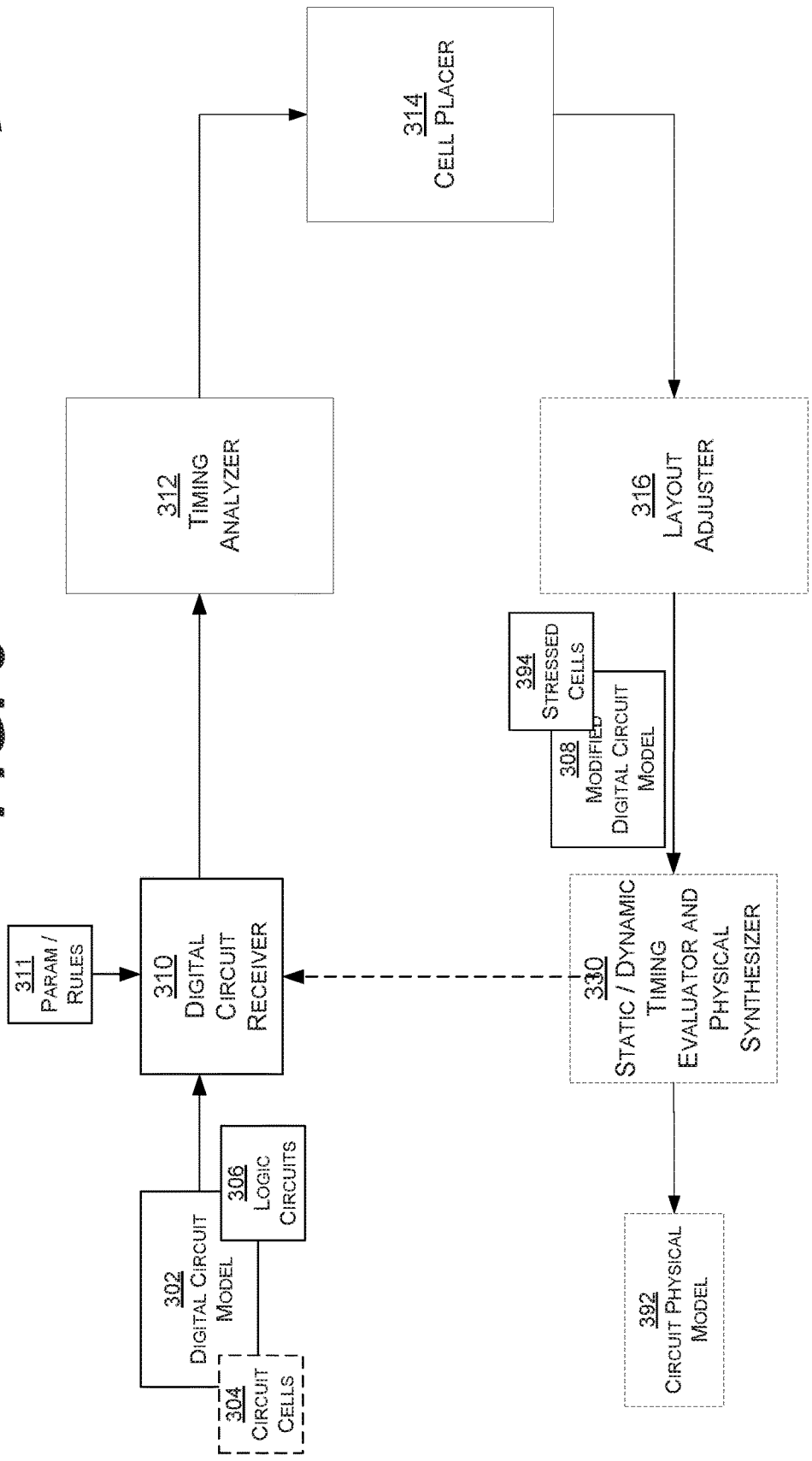
FIG. 3 is a block diagram of an example embodiment of a system in accordance with the disclosed subject matter.

FIG. 3 is a block diagram of an example embodiment of a system 300 in accordance with the disclosed subject matter. In the illustrated embodiment, during the integrated circuit design process, a digital circuit model 302 may be created. It may be desirable to adjust the circuit cells used to realize the digital circuit model 302. The components of system 300 may be employed to adjust the circuit cells associated with the model 302 as described below.

In the illustrated embodiment, the system 300 may be employed to adjust the digital circuit model 302 before performing physical manufacture. In another embodiment, the system 300 may be employed to adjust or predict the timing of the model 302 (or resulting modified digital circuit model 308) earlier in the design process (e.g., during synthesis). It is understood that the above are merely a few illustrative examples to which the disclosed subject matter is not limited.

In one embodiment, the system 300 may receive a digital circuit model 302. In various embodiments, the digital circuit model 302 may include a physically synthesized, or laid out model. In another embodiment, the model 302 may include a representation of the circuit intermediate to the two ends of the design process. It is understood that the above are merely a few illustrative examples to which the disclosed subject matter is not limited.

The model 302 may include a plurality of logic circuits 306 or representations thereof. In various embodiments, the logic circuit 306 may include combinatorial logic circuits that are divided by register elements (e.g., flip-flops, latches, and so on). In some embodiments, the logic circuit 306 may be divided into relatively primitive logical functions. (e.g., AND gates, NOR gates, MUXes, and so on). Regardless of the level of granularity at which the logic circuits 306 are divided into, as described below, they will be mapped or associated with respective cells 304.

In the current embodiment, the model 302 will be described as including a number of circuit cells 304 that represent or are associated with the logic circuits 306. In such an embodiment, the circuit model 302 may have already undergone part of the layout, or place and route process. In such an embodiment, each of the cells 304 may include standard unstressed cells. In this context, an unstressed cell is one which does not, for example, use the techniques of poly-cut break 220 and active cuts 222*a*/222*b* in FIG. 2*a*. Cells that perform the same logic function, but differ for other reasons (e.g., stressed vs. unstressed, single-row height vs. multi-row height, increased drive strength, mirrored or flipped, and so on) may be thought of as belonging to a single cell family.

The circuit model 302 may be received by a digital circuit receiver 310. The digital circuit receiver 310 may be configured to check the correctness or validity of the circuit model 302 against a predefined set of rules or parameters 311. These rules and parameters 311 may vary based upon the embodiment.

In the illustrated embodiment, the timing of the logic circuits 306 may be determined or analyzed by the timing analyzer circuit or engine 312. As described above, each logic circuit 306 may have a certain amount of time to complete its logical function. When determining the timing of each logic circuit 306, a number of logic circuits 306 may fail the timing requirement or otherwise present themselves as candidates for timing improvement (e.g., a circuit 306 may meet its timing requirement but it may be beneficial for its delay to be decreased in order to help another circuit). For various reasons a number of candidate circuits or cells may be identified.

The system 300 may include a cell placer circuit or engine 314. The cell placer 314 may be configured to, where feasible, replace each candidate cell 304 with a stressed version of the cell 304 (e.g., the cells 200 and 299 of FIGS. 2*a* and 2*b*, respectively). In order to do so, the cell placer 314 may be configured to select a stressed cell from a cell family or other cells that perform the same logical function as the unstressed cell.

In some embodiments, the cell placer 314 may simply replace a single-rowed unstressed, candidate cell with a comparable single-rowed stressed cell. In another embodiment, the cell placer 314 may replace a single-rowed unstressed, candidate cell with a functionally equivalent double or multi-rowed stressed cell. In such an embodiment, the layout or placement of the cells 304 may need to be adjusted. In yet another embodiment, the cell placer 314 may replace two single-rowed unstressed, candidate cells with a double or multi-rowed stressed cell that performs both of the logical functions as the two unstressed cells. For example, if unstressed single-rowed NAND and NOR cells needed to be replaced, the cell placer 314 may replace the two cells with a single double-rowed stressed cell that performs a NAND function via the upper row and a NOR function via the lower row. In yet one more embodiment, the cell placer 314 may replace a candidate cell and a non-candidate cell (i.e. one that meets timing requirements) with a functionally equivalent double rowed stressed cell, if the improvement is not detrimental for other reasons. It is understood that the above are merely a few illustrative examples to which the disclosed subject matter is not limited.

In various embodiments, the system 300 may include a layout adjuster circuit or engine 316. In such an embodiment, the layout adjuster 316 may be configured to re-perform the layout or cell placement of the cells 304 within the model 302. In some embodiments, if the cell pacer 314 replaces a single-rowed cell with a double-rowed cell the layout or placement of the other cells 304 within the model 302 may be affected. For example, a second cell (possibly a non-candidate cell) may have to be moved to accommodate a larger stressed cell. The layout adjuster 316 may perform that movement and rearrangement of the cells 304. In another embodiment, the layout adjuster 316 may be configured to re-perform the layout or cell placement of the stressed cells. In various embodiments, the layout adjuster 316 may not be included in the system 300.

The cell placer 314 or layout adjuster 316 may generate a modified digital circuit model 308. This modified digital circuit model 308 may include the stressed cells 394. This modified circuit model 308 may also include a number of unstressed cells that were not replaced by the cell placer 314. It is understood that the above are merely a few illustrative examples to which the disclosed subject matter is not limited.

In various embodiments, this new or adjusted digital circuit model 308 may then be reviewed or processed by other tools. For example, a static and/or dynamic timing evaluator 330 may perform a more detailed and accurate form of timing analysis on the model. In another embodiment, the physical synthesizer 330 may be employed to turn the digital circuit model 308 into a circuit physical model 392 that includes information needed to physically manufacture the digital circuit.

In various embodiments, the results of these other tools 330 may be fed back through the system 300, for additional passes or to re-evaluate a modified digital circuit model 308. It is understood that the above are merely a few illustrative examples to which the disclosed subject matter is not limited.

In another embodiment, the placement of stressed cells may be part of an initial physical design (e.g., placement, routing, and so on) in which the circuit design or logic circuits 306 are converted into a model 308 with a number of circuit cells 304. This is opposed to the example above in which a model 302 that includes existing cells 304 was improved by replacing unstressed cells with stressed cells. In such an embodiment, the placement of the cells 304 may occur for the first time when the cell placer 314 is used.

In such an embodiment, the cell placer 314 may be configured to select a certain cell 304 for each logic circuit 306. The cell placer 314 may be configured to first associate each logic circuit 304 with a cell family that performs the desired logical function. The cell placer 314 may then select from the cell family either an unstressed or stressed version of the cell and place it within the modified circuit model 308. In various embodiments, the selection between an unstressed and stressed version of the cell may be based upon the timing requirements of the logic circuit, and/or the area constraints of the model 302. It is understood that the above are merely a few illustrative examples to which the disclosed subject matter is not limited.

Figure 4:
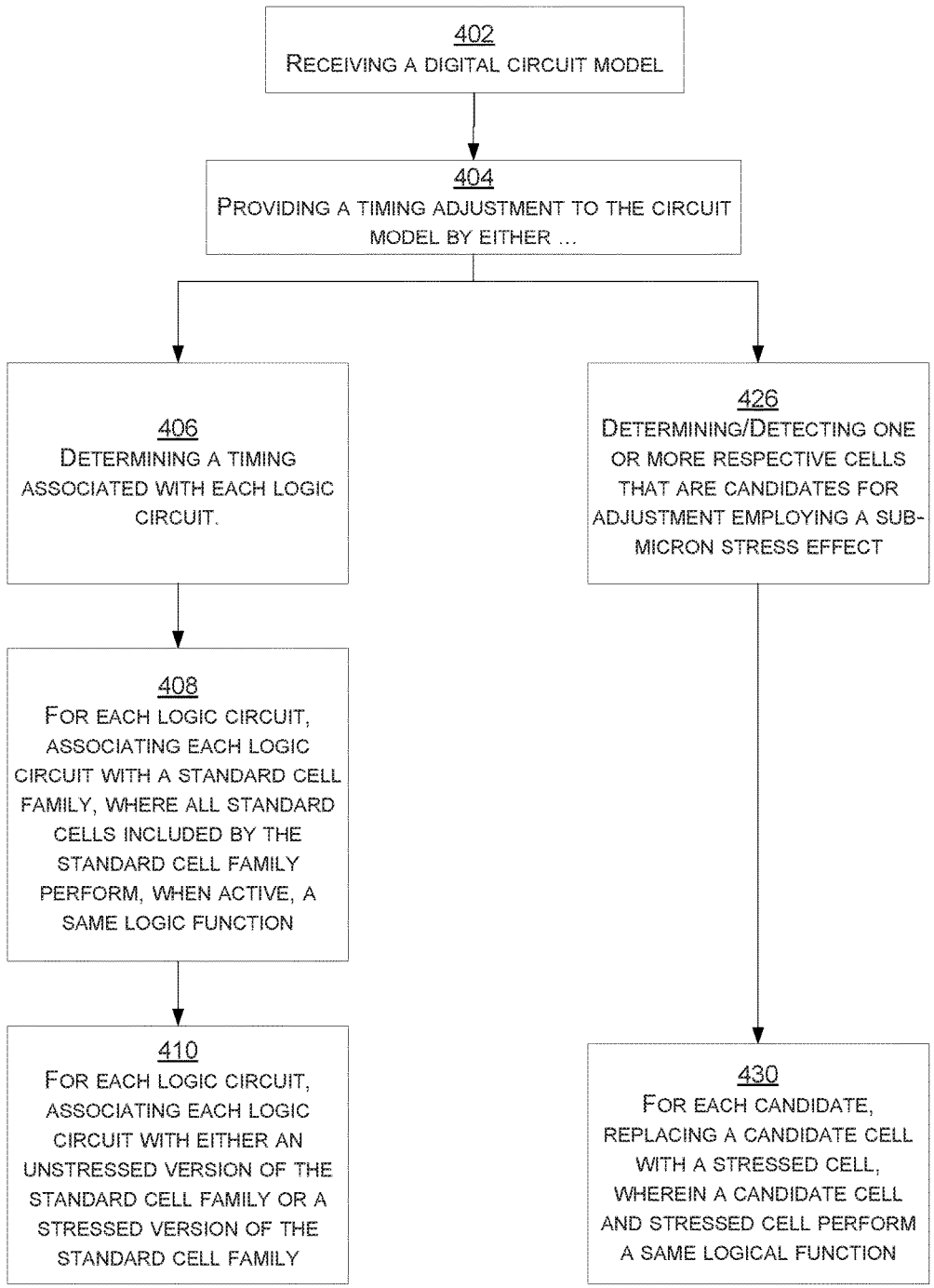
FIG. 4 is a flowchart of an example embodiment of a technique in accordance with the disclosed subject matter.

FIG. 4 is a flow chart of an example embodiment of a technique in accordance with the disclosed subject matter. In various embodiments, the technique 400 may be used or produced by the systems such as those of FIG. 3. Portions of technique 400 may be used to produce cells or systems such as that of FIG. 1, 2*a*, or 2*b*. Although, it is understood that the above are merely a few illustrative examples to which the disclosed subject matter is not limited. It is understood that the disclosed subject matter is not limited to the ordering of or number of actions illustrated by technique 400.

Block 402 illustrates that, in one embodiment, a digital circuit model that includes logic circuits that are represented by respective cells may be received, as described above. In various embodiments, one or more of the action(s) illustrated by this Block may be performed by the apparatuses or systems of FIG. 3 or 5, the digital circuit receiver of FIG. 3, as described above.

Block 404 illustrates that, in one embodiment, a timing adjustment to the circuit model may be provided by at least one of two methods, as described above. In one embodiment, the timing adjustment may be provided by the method described in Blocks 406, 408, and 410. In another embodiment, the timing adjustment may be provided by the method described in Blocks 426 and 430. It is understood that the above are merely a few illustrative examples to which the disclosed subject matter is not limited.

Block 406 illustrates that, in one embodiment, a timing associated with each of the logic circuits may be determined, as described above. In various embodiments, one or more of the action(s) illustrated by this Block may be performed by the apparatuses or systems of FIG. 3 or 5, the timing analyzer of FIG. 3, as described above.

Block 408 illustrates that, in one embodiment, each logic circuit may be associated with a standard cell family, as described above. In such an embodiment, all standard cells included by the standard cell family perform, when active, a same logic function, as described above. In various embodiments, one or more of the action(s) illustrated by this Block may be performed by the apparatuses or systems of FIG. 3 or 5, the cell placer of FIG. 3, as described above.

Block 410 illustrates that, in one embodiment, each logic circuit may be associated with either an unstressed version of the standard cell family or a stressed version of the standard cell family, as described above. In various embodiments, one or more of the action(s) illustrated by this Block may be performed by the apparatuses or systems of FIG. 3 or 5, the cell placer of FIG. 3, as described above.

In various embodiments, the stressed cell may include at least one of either a gate-cut break portion or an active-cut portion, as described above. In such an embodiment, the gate-cut break portion may include a gate electrode, a first gate-cut shape disposed to cut the gate electrode, wherein the first gate-cut shape is disposed upon a row-boundary, a second gate-cut shape disposed upon the row-boundary, and a gate-cut break disposed between the first gate-cut shape and the second gate-cut shape, as described above. In one embodiment, the active-cut portion may include an active region, and an active-cut shape disposed to cut the active region, wherein the active-cut shape is also completely enclosed within the stressed cell, as described above.

In some embodiments, the stressed cell may include both at least one gate-cut break portion and at least one active-cut portion, as described above. In another embodiment, the stressed cell may include a gate-cut break portion, at least two edge row boundaries and at least a middle row boundary, as described above. In some embodiments, the stressed cell may include a first gate-cut shape and the second gate-cut shape that are disposed upon the middle row boundary, as described above. In various embodiments, the stressed cell includes a PMOS portion and a NMOS portion, as described above. The gate-cut portion may be disposed closer to the PMOS portion than the NMOS portion, and any active-cut portion is disposed closer to the NMOS portion than the PMOS portion, as described above.

Conversely, Block 426 illustrates that, in one embodiment, one or more respective cells that are candidates for adjustment may be determined, as described above. In such an embodiment, the adjustment may be made by employing a sub-micron stress effect, as described above. In various embodiments, one or more of the action(s) illustrated by this Block may be performed by the apparatuses or systems of FIG. 3 or 5, the cell placer of FIG. 3, as described above.

Block 548 illustrates that, in one embodiment, for each candidate, a candidate cell may be replaced with a stressed cell, as described above. In such an embodiment, a candidate cell and stressed cell may perform a same logical function, as described above. In various embodiments, one or more of the action(s) illustrated by this Block may be performed by the apparatuses or systems of FIG. 3 or 5, the cell placer of FIG. 3, as described above.

Figure 5:
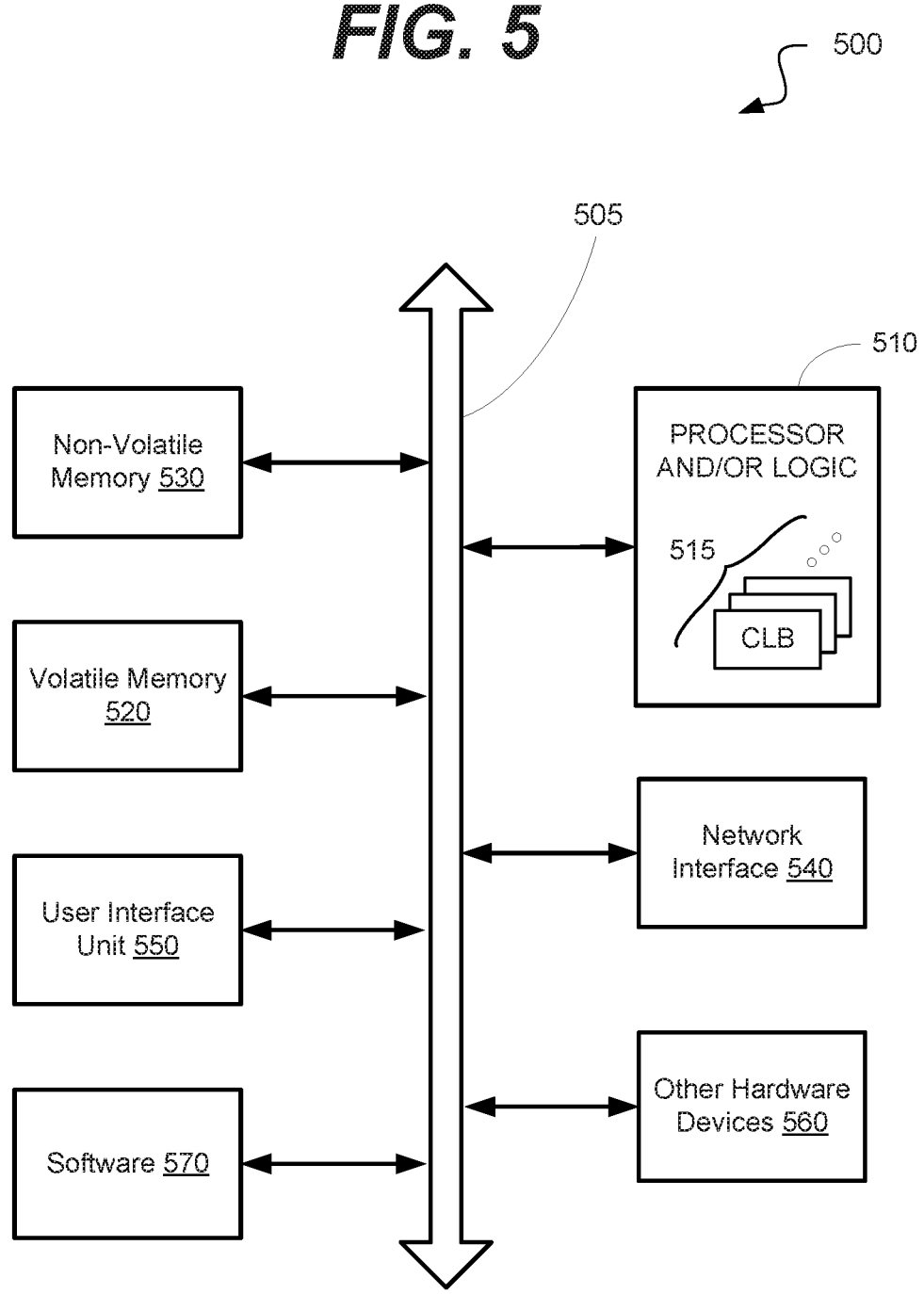
FIG. 5 is a schematic block diagram of an information processing system that may include devices formed according to principles of the disclosed subject matter.

FIG. 5 is a schematic block diagram of an information processing system 500, which may include semiconductor devices formed according to principles of the disclosed subject matter.

Referring to FIG. 5, an information processing system 500 may include one or more of devices constructed according to the principles of the disclosed subject matter. In another embodiment, the information processing system 500 may employ or execute one or more techniques according to the principles of the disclosed subject matter.

In various embodiments, the information processing system 500 may include a computing device, such as, for example, a laptop, desktop, workstation, server, blade server, personal digital assistant, smartphone, tablet, and other appropriate computers, and so on or a virtual machine or virtual computing device thereof. In various embodiments, the information processing system 500 may be used by a user (not shown).

The information processing system 500 according to the disclosed subject matter may further include a central processing unit (CPU), logic, or processor 510. In some embodiments, the processor 510 may include one or more functional unit blocks (FUBs) or combinational logic blocks (CLBs) 515. In such an embodiment, a combinational logic block may include various Boolean logic operations (e.g., NAND, NOR, NOT, XOR, and so on), stabilizing logic devices (e.g., flip-flops, latches, and so on), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 500 according to the disclosed subject matter may further include a volatile memory 520 (e.g., a Random Access Memory (RAM), and so on). The information processing system 500 according to the disclosed subject matter may further include a non-volatile memory 530 (e.g., a hard drive, an optical memory, a NAND or Flash memory, and so on). In some embodiments, either the volatile memory 520, the non-volatile memory 530, or a combination or portions thereof may be referred to as a "storage medium". In various embodiments, the volatile memory 520 and/or the non-volatile memory 530 may be configured to store data in a semi-permanent or substantially permanent form.

In various embodiments, the information processing system 500 may include one or more network interfaces 540 configured to allow the information processing system 500 to be part of and communicate via a communications network. Examples of a Wi-Fi protocol may include, but are not limited to, Institute of Electrical and Electronics Engineers (IEEE) 802.11g, IEEE 802.11n, and so on. Examples of a cellular protocol may include, but are not limited to: IEEE 802.16m (a.k.a. Wireless-MAN (Metropolitan Area Network) Advanced), Long Term Evolution (LTE) Advanced, Enhanced Data rates for GSM (Global System for Mobile Communications) Evolution (EDGE), Evolved High-Speed Packet Access (HSPA+), and so on. Examples of a wired protocol may include, but are not limited to, IEEE 802.3 (a.k.a. Ethernet), Fibre Channel, Power Line communication (e.g., HomePlug, IEEE 1901, and so on), and so on. It is understood that the above are merely a few illustrative examples to which the disclosed subject matter is not limited.

The information processing system 500 according to the disclosed subject matter may further include a user interface unit 550 (e.g., a display adapter, a haptic interface, a human interface device, and so on). In various embodiments, this user interface unit 550 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 500 may include one or more other devices or hardware components 560 (e.g., a display or monitor, a keyboard, a mouse, a camera, a fingerprint reader, a video processor, and so on). It is understood that the above are merely a few illustrative examples to which the disclosed subject matter is not limited.

The information processing system 500 according to the disclosed subject matter may further include one or more system buses 505. In such an embodiment, the system bus 505 may be configured to communicatively couple the processor 510, the volatile memory 520, the non-volatile memory 530, the network interface 540, the user interface unit 550, and one or more hardware components 560. Data processed by the processor 510 or data inputted from outside of the non-volatile memory 530 may be stored in either the non-volatile memory 530 or the volatile memory 520.

In various embodiments, the information processing system 500 may include or execute one or more software components 570. In some embodiments, the software components 570 may include an operating system (OS) and/or an application. In some embodiments, the OS may be configured to provide one or more services to an application and manage or act as an intermediary between the application and the various hardware components (e.g., the processor 510, a network interface 540, and so on) of the information processing system 500. In such an embodiment, the information processing system 500 may include one or more native applications, which may be installed locally (e.g., within the non-volatile memory 530, and so on) and configured to be executed directly by the processor 510 and directly interact with the OS. In such an embodiment, the native applications may include pre-compiled machine executable code. In some embodiments, the native applications may include a script interpreter (e.g., C shell (csh), AppleScript, AutoHotkey, and so on) or a virtual execution machine (VM) (e.g., the Java Virtual Machine, the Microsoft Common Language Runtime, and so on) that are configured to translate source or object code into executable code which is then executed by the processor 510.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, and so on). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. A method comprising:
   receiving a circuit model that includes logic circuits that are represented by respective cells; and
   providing, to a computer, a timing adjustment to the circuit model by:
      determining, by the computer, one or more respective cells that are candidates for adjustment by employing a sub-micron stress effect, and
      for each candidate, replacing a candidate cell with a stressed cell, wherein a candidate cell and stressed cell perform a same logical function; and
   wherein each stressed cell includes:
      a gate electrode,
      a first gate-cut shape disposed to cut the gate electrode, wherein the first gate-cut shape is disposed upon a row-boundary,
      a second gate-cut shape disposed upon the row-boundary, a gate-cut break disposed between the first gate-cut shape and the second gate-cut shape,
an active region, and
an active-cut shape disposed to cut the active region, wherein the active-cut shape is also completely enclosed within the respective stressed cell.

2. The method of claim 1, wherein a circuit induced delay caused by the stressed cell is equal to or less than one-half of the circuit induced delay caused by the candidate cell.

3. The method of claim 1, wherein the stressed cell includes a PMOS portion and a NMOS portion, and wherein the gate-cut break is disposed closer to the PMOS portion than the NMOS portion.

4. The method of claim 1, wherein the stressed cell includes a NMOS portion, and wherein the NMOS portion includes the active-cut shape.

5. The method of claim 1, wherein the first gate-cut and second gate-cut is disposed in parallel to a metal layer.

6. The method of claim 1, wherein the candidate cell includes at least one input and at least one output, and wherein all of the inputs of the candidate cell, the outputs of the candidate cell, and the stressed cell all operate in a same voltage domain.

7. The method of claim 1, wherein the candidate cell includes a height of one cell row, and wherein the stressed cell includes a height of at least two cell rows.

8. The method of claim 1, wherein replacing a candidate cell with a stressed cell includes
identifying two candidate cells whose logical functions can be performed by a single stressed cell, wherein each of the two candidate cells include a height of one cell row and wherein the stressed cell includes a height of two cell rows;
determining if the two candidate cells may be placed next to each other; and
if so, replacing the two candidate cells with the single stressed cell.

9. The method of claim 1, wherein the stressed cell includes at least two edge row boundaries and at least a middle row boundary, and
wherein the first gate-cut shape and the second gate-cut shape are disposed along the middle row boundary.

10. The method of claim 1, wherein the stressed cell provides, when operating, at least one-and-a-half times a drive strength as the candidate cell.

11. A computer program product for adjusting a timing of a digital circuit, the computer program product being tangibly embodied on a non-transitory computer-readable medium and including executable code that, when executed, is configured to cause a data processing apparatus to:
detect a timing issue with first cell, wherein the first cell, when active, performs a combinatorial logic function;
replace, within a circuit model, the first cell with a second cell that, when active, performs a same combinatorial logic function as the first cell more quickly than the first cell; and
wherein the second cell includes:
a gate electrode,
a first gate-cut shape disposed to cut the gate electrode, wherein the first gate-cut shape is disposed upon a row-boundary,
a second gate-cut shape disposed upon the row-boundary,
a gate-cut break disposed between the first gate-cut shape and the second gate-cut shape,
an active region, and
an active-cut shape disposed to cut the active region, wherein the active-cut shape is also completely enclosed within the respective stressed cell.

12. The computer program product of claim 11, the executable code that, when executed, is configured to cause the data processing apparatus to:
replace, within a circuit model, the first cell with a second cell that includes a PMOS portion and a NMOS portion, and wherein the gate-cut break is disposed closer to the PMOS portion than the NMOS portion.

13. The computer program product of claim 11, the executable code that, when executed, is configured to cause the data processing apparatus to:
replace, within a circuit model, the first cell with a second cell that includes a NMOS portion, and wherein the NMOS portion includes the active-cut shape.

14. The computer program product of claim 11, the executable code that, when executed, is configured to cause the data processing apparatus to:
replace, within a circuit model, the first cell of a single cell row height with a second cell of a height of two cell rows.

15. The computer program product of claim 11, the executable code that, when executed, is configured to cause the data processing apparatus to:
replace, within a circuit model, the first cell with a second cell that includes at least two edge row boundaries and at least a middle row boundary, and
wherein the first gate-cut shape and the second gate-cut shape are disposed upon the middle row boundary.

16. The computer program product of claim 11, the executable code that, when executed, is configured to cause the data processing apparatus to:
replace the first cell and a third cell with the second cell, wherein the second cell, when active, performs a first logic function performed, when active, by the first cell, and a second logic function performed, when active, by the third cell.

17. A method comprising:
receiving a circuit model that includes logic circuits which include representations of a set of register circuits;
determining, by a computer, a timing associated with each logic circuit; and
for each logic circuit,
associating each logic circuit with a standard cell family, where all standard cells included by the standard cell family perform, when active, a same logic function, and
associating each logic circuit with either an unstressed version of the standard cell family or a stressed version of the standard cell family,
wherein the stressed cell includes at least one of either a gate-cut break portion or an active-cut portion,
wherein the gate-cut break portion includes:
a gate electrode,
a first gate-cut shape disposed to cut the gate electrode, wherein the first gate-cut shape is disposed upon a row-boundary,
a second gate-cut shape disposed upon the row-boundary, and
a gate-cut break disposed between the first gate-cut shape and the second gate-cut shape; and
wherein the active-cut portion includes:
an active region, and an active-cut shape disposed to cut the active region, wherein the active-cut shape is also completely enclosed within the stressed cell.

18. The method of claim 17, wherein the stressed cell includes both at least one gate-cut break portion and at least one active-cut portion.

19. The method of claim 17, wherein the stressed cell includes a gate-cut break portion, at least two edge row boundaries and at least a middle row boundary, and wherein the first gate-cut shape and the second gate-cut shape are disposed upon the middle row boundary.

20. The method of claim 17, wherein the stressed cell includes a PMOS portion and a NMOS portion,
wherein any gate-cut portion is disposed closer to the PMOS portion than the NMOS portion, and
wherein any active-cut portion is disposed closer to the NMOS portion than the PMOS portion.

* * * * *